Patented May 26, 1942

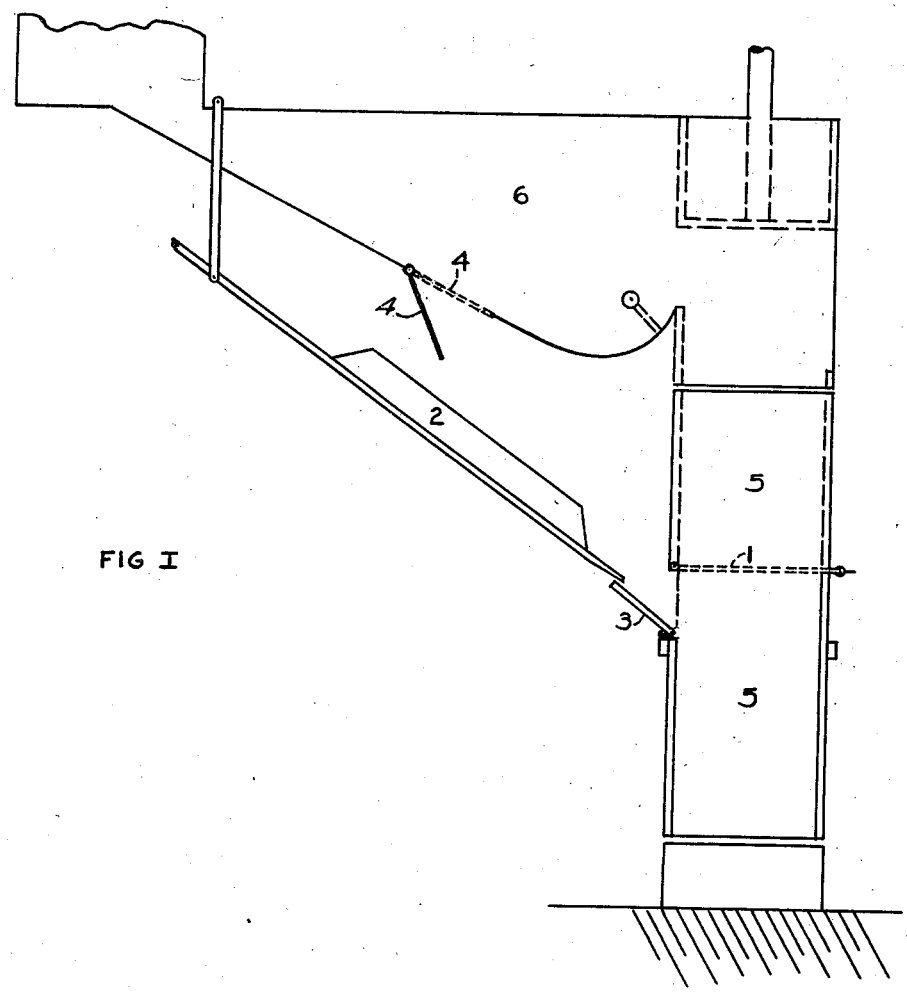
FIG I

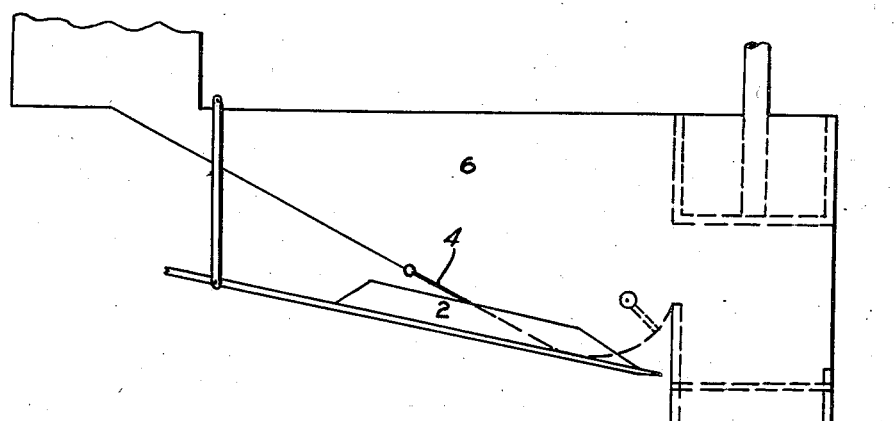

2,284,044

UNITED STATES PATENT OFFICE 2,284,044

COTTON BALING APPARATUS

Wayne Denton Cohea and Howard Sentenel Eubanks, Frederick, Okla.

Application June 24, 1939, Serial No. 281,004

1 Claim. (Cl. 100—25)

The invention relates to improvements in cotton-baling apparatus in which a plurality of doors operate in conjunction with a movable chute; and the object of the improvement is to provide a means for catching and holding cotton which would, under present ginning methods, using present baling equipment, go into and make up the bottom of a bale of cotton and place same in the center of bale and thereby make possible a truer sample of cotton when taken from either the bottom or top of bale.

With the foregoing and other objects in view which will appear as the description proceeds, the invention resides in the combination and arrangement of parts and in details of construction herein described and claimed, it being understood that changes in the precise embodiment of the invention herein can be made within the scope of what is claimed without departing from the spirit of the invention.

Under present ginning practice, there is no interval between the ginning of separate bales of cotton and therefore one side of a bale of cotton is made up of the cotton all ready in the gin machinery from the previous bale. Through the use and operation of this invention cotton from the previous bale can be placed in the center of the new bale.

The invention together with its objects and advantages will best be understood from a study of the following description taken in connection with the accompanying drawings wherein—

Figure I shows a side view of the invention when cotton is being fed into the lower section of the press box.

Figure II shows a side view of the invention when the cotton is being fed into the upper section of the press box.

Figure III—A shows a cross section of tracks for a sliding door within the press box and Figure III—B shows a side view of tracks for the sliding door with round inclosed ends which act as a stop for the sliding door, and which work in conjunction with rollers 8a and 8b to make a hinge permitting sliding door 1 to drop down along the back of the lower section of the press box 5 when the sliding door is pulled out.

Figure IV—A shows a side view of sliding door 1 and Figure IV—B shows a top view of sliding door 1.

Like characters refer to like parts throughout the several views.

The sliding door 1 is constructed of steel plate. 8a and 8b are rollers on the sliding door 1 which causes the sliding door 1 to slide along its tracks more easily. 7 designates round inclosed ends of tracks which prevent the sliding door 1 from being pulled out of the tracks and which work in conjunction with rollers 8a and 8b on the sliding door 1 to make a hinge which permits the sliding door when it is pulled out of the press box to drop down along the back side of the press box as shown in Figure II. 9 is a handle on the sliding door 1 for use in raising and lowering the sliding door and pushing it in and pulling it out of the press box. A narrow opening or slit is cut across the back of the press box 5 to provide an opening for this door. The tracks as shown in Figures III—A and III—B are fastened to both sides of the inside of press box 5 and are placed parallel to the bottom of the press box and parallel to each other. The round inclosed ends of the tracks extend a few inches outside the back of the press box so as to permit the sliding door 1 to drop down along the back of the press box as shown in Figure II.

3 is a door in the front of the press box extending the entire width of the press box. Door 3 is hinged at the bottom. Fasteners (not shown) are placed at the top of door 3 to hold it in place when closed.

4 is a door cut across the entire width of the bottom of conveyor 6, and is hinged along the higher side.

A chute 2 is swingable to the Fig. 1 position to receive material through door 4 and deliver it through door 3. Using this invention, before press box 5 is placed in position to receive loose cotton coming from gin machinery along conveyor 6, sliding door 1 is raised and pushed into place separating the press box into two separate compartments. After this is done the press box is placed in position so as to catch the loose cotton coming from gin machinery along conveyor 6 as is done under present ginning practices and this cotton falls upon sliding door 1 and is held in the upper compartment of the press box. The upper compartment will hold all the cotton from the previous bale and part of the cotton being ginned.

When the upper compartment of the press box is almost filled with loose cotton the door 3 is opened, the chute 2 is lowered, and the trap door 4 is opened. The cotton which is being carried along conveyor 6 by gravity falls through trap door 4 into chute 2 from which it enters the door 3 in front of the press box.

When the lower compartment of press box 5 is filled with loose cotton, the trap door 4 is closed. When the cotton has run out of chute 2 it is raised, door 3 is closed and sliding door 1 is pulled out and opened. After this is done the usual baling practices are followed.

Having thus described the invention, what we claim is new is:

Baling means comprising a press box, removable means for dividing said press box into a plurality of compartments and means for selectively feeding desired portions of an oncoming stream of material to be baled to any desired one of said compartments, whereby said desired portions of the oncoming stream are caused to occupy predetermined positions in the finished bale.

WAYNE DENTON COHEA.
HOWARD SENTENEL EUBANKS.